Patented Feb. 12, 1935

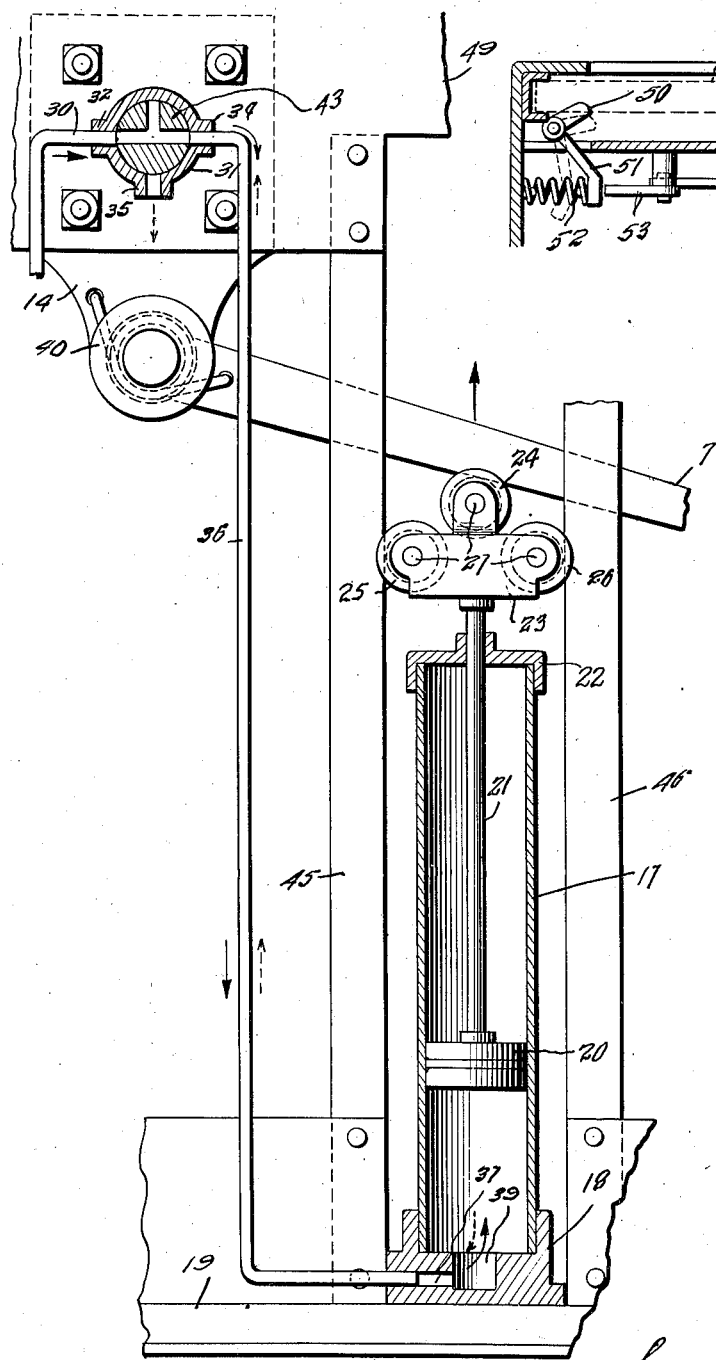

1,990,624

UNITED STATES PATENT OFFICE 1,990,624

PNEUMATIC VEHICLE WINDOW DEVICE

George I. Waddey, Nashville, Tenn.

Application August 23, 1933, Serial No. 686,472

4 Claims. (Cl. 268—125)

This invention relates in general to automotive vehicle accessories, and more particularly has reference to a pneumatic window device.

Previous to this time the windows of automobiles or other vehicles such as airplanes have customarily been adapted to be wound up and down through hand operated levers. This is a tedious and sometimes difficult operation, and when the parts of these hand operated mechanisms become worn it is very often difficult or impossible to fix a window in a completely closed position.

While pneumatic devices have been provided heretofore for opening and closing vehicle windows these have generally proved ineffective in practice. The principal disadvantage which has attended such devices is that some have been so complex of assembly as not to be feasible for actual use. Further, the same have not provided for fixing a window in a closed position which I find is essential to lend practicality to such structures.

An object of this invention is to provide a pneumatic device for closing the windows of automotive vehicles or the like.

Another object of this invention is to provide a pneumatic device for opening and closing the windows of automotive vehicles or the like in which a window when closed is fixed in position apart from the pneumatic action of the device.

A further object of this invention is to provide a pneumatic device for opening and closing the windows of automotive vehicles or the like, simple of construction and economical of manufacture, which will function effectively and practically.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Fig. 2 is an enlarged view of the device including only fragmentary views of the door and showing the valve and a cylinder in section.

Fig. 3 is a top view of the supplemental latch adapted to act in conjunction with the valve handle for mechanically fixing a window in the closed position.

Figure 1:
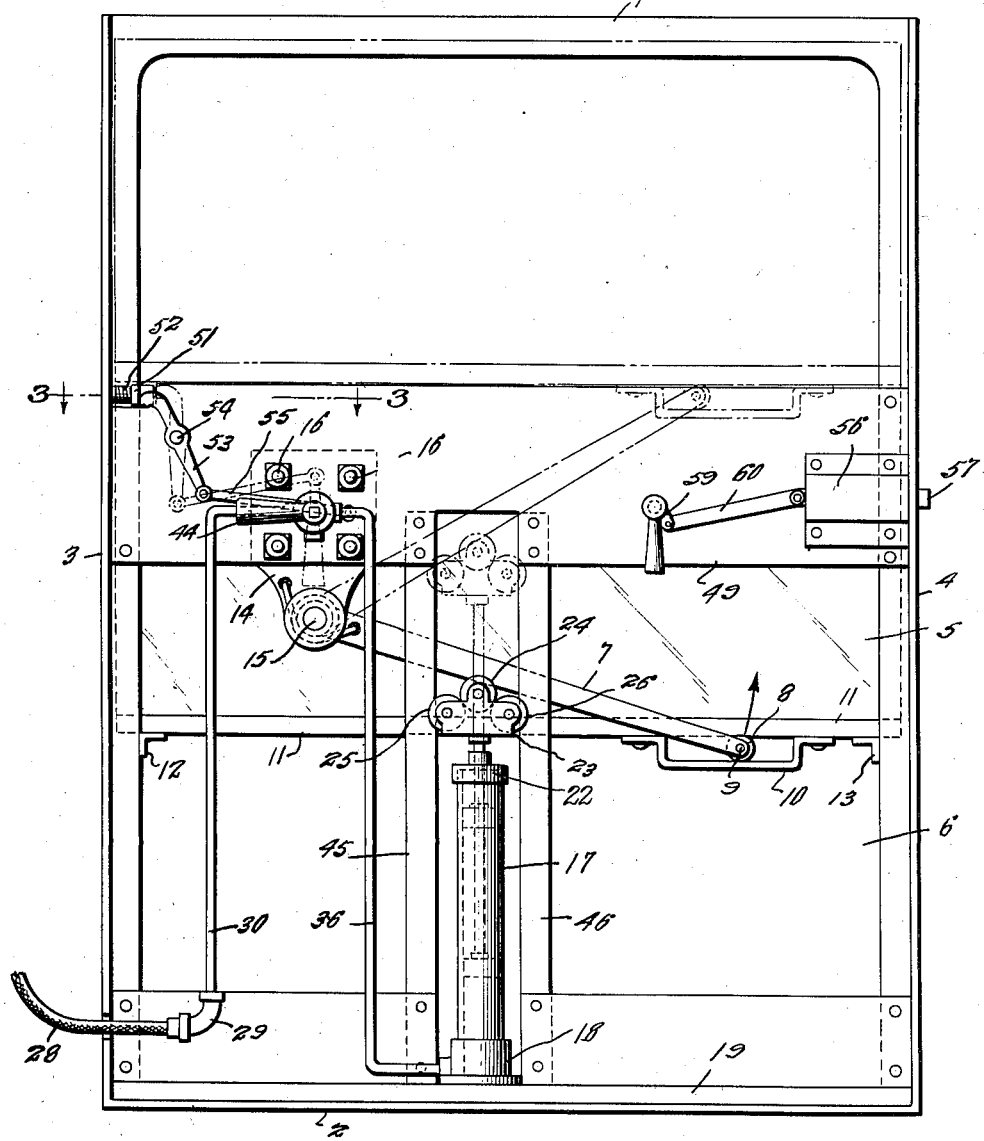
Fig. 1 is a view of a vehicle door from the inside (with the covering cut away) showing my device and its manner of installation, and operation in phantom.

Referring more particularly by numerals to the drawings in which the same and similar elements are designated by like symbols of reference throughout, and more especially to Fig. 1, there is shown a conventional door of any type of vehicle comprising a top and bottom 1 and 2 and sides 3 and 4. The top portion is open for closing with a pane of glass 5 and the bottom portion is covered as at 6. The glass pane 5 is, of course, adapted to slide from the bottom portion to the top portion in the usual manner.

My invention contemplates the provision of an apparatus for pneumatically raising and lowering the glass pane and fixing the glass pane when fully raised, apart from the pneumatic apparatus but operable therewith.

In accordance with my invention the pane 5 is adapted to be raised through the action of a lever 7 having a roller 8 pivoted on the end thereof through a pin 9. The roller 8 is fitted in a guide 10 fixed to the underside of a window channel 11 in which the bottom edge of the pane 5 is fitted. When the window is fully open the channel 11 is adapted to rest on brackets 12 and 13 acting as bottom stops.

The top end of the lever 7 is pivoted on a bracket 14 through a pin 15. The bracket 14 is fixed to the door by bolts 16 and is adapted to have a valve assembly to be later more fully described mounted thereon. It will be appreciated that the pane 5 may be raised by pushing up on the lever 7. I provide a pneumatic arrangement for effecting this action.

This, as is better shown in Fig. 2 comprises a cylindrical air casing 17 for fitting in an upright position in a base portion 18 seated on a bottom frame member 19 of the door. A piston 20 carrying a rod 21 on the top thereof is adapted to operate in the cylinder 17 which is provided with a top closure 22 having a central collared aperture for accommodating the rod 21. A frame member 23 is mounted on the top of the rod for carrying a top roller 24 and two side rollers 25 and 26, each rotatably mounted on the frame member by pins 27. The peripheries of the rollers are channeled and the lower edge of the lever 7 is adapted to ride in the peripheral channel in the top roller 24.

The cylinder 17 is adapted to receive air under pressure introduced through a flexible inlet line 28 as shown in Fig. 1, from any suitable source, for example, a pressure tank (not shown) in which air is maintained under a desirable pressure by a pump operated through the power plant of the vehicle. The line is connected to a coupling 29 which is jointed to a line 30, communicating with a two way valve 31, as shown in Fig. 2. The valve casing is mounted on the bracket 14 and provided with an inlet 32 and outlets 34 and 35, the line 30 being connected to the inlet 32. Air under pressure introduced into the valve 31 by manipulation of the valve to be later described, will be directed from the outlet 34 into a line 36 communicating therewith which is connected to the cylinder seat 18, and passes into the cylinder through a communicating aperture 37 provided in the seat opening in a central well 39 therein. This will drive the piston upward and thereby raise the lever 7 to close the window which will remain closed as long as the pressure is maintained.

The lever 7 is adapted to be raised under the tension of a spring 40 wound around the pin 15 for pivoting the lever, having its ends fixed in the bracket 14 and lever respectively. When the pressure in the cylinder is released, the lever and pane will be allowed to draw downward under the force of gravity but resisted, however, by the tension of the spring which, while sufficient to retard the action of opening, is not great enough to prevent the pane from dropping. The spring is provided to prevent the pane from falling and thereby becoming damaged or broken. There will also be a cushioning effort exerted on the pane by the air being forced out of the lower portion of the cylinder.

The valve casing 31, as already explained, contains a valve element 43. This is adapted to be manipulated to connect the inlet lines 30 and 36, as described, to raise the pane. When it is desired to lower the pane, the valve is manipulated to connect the line 36 with the outlet to waste 35, in which position the inlet line 30 is closed. The pane is thus allowed to drop under the force of gravity with the exhausting air in the cylinder acting as a cushion. In the position shown in Fig. 2 the inlet lines 30 and 36 are connected, so that the pane will be raised. A handle 44 as shown in Fig. 1 is provided for operating the valve.

A pair of spaced upright guides 45 and 46 extend on each side of the cylinder from the bottom frame member 19 to a top frame member 49. The side rollers 25 and 26 carried by the piston rod run on such members 45 and 46 and are guided thereby.

When the pane 5 is fully raised, and the window is closed, it will be held by the pressure in the cylinder. In order to insure maintaining the window closed in the event of pressure failure, or slight leakage, I provide a catch 50 as shown in Fig. 3. This is pivoted to the side 3 of the door and is provided with an angular integral arm 51. The catch 50 is adapted to press against the pane 5 and catch under the pane when it is fully raised by a spring 52 fitted between the side 1 and the end of the lever 51. The end of the lever 51 is adapted to be pressed by one end of a rocker arm 53, better shown in Fig. 1, to release the catch 50, and allow the pane 5 to be drawn downwardly. The arm 53 is pivoted to the frame member 49 by a pin 54 and the lower end connected by an arm 55 to the top of the valve handle 44 so that the catch 50 is automatically released when the valve handle is manipulated to effect lowering of the window.

The door 1 is shown provided with a conventional latch mechanism 56 with a catch 57 operable through a lever connected to the latch mechanism through arms 59 and 60.

The operation of my pneumatic window opening and closing device will be readily understood from the foregoing description. When pane 5 is in the closed position as illustrated in phantom in Fig. 1, the piston in the cylinder will be held raised under pressure to maintain the window closed, in which position it will also be positively held by the catch 50.

When it is desired to lower the pane to open the window, the valve handle 44 is manipulated to connect the line 36 to waste through the outlet 34. This action releases the catch 50 so that the pane is allowed to drop against the tension of the spring 40, and cushioned by the air being driven out of the cylinder below the piston 20.

To raise the pane to close the window the valve handle 44 is manipulated to connect the pressure lines 30 and 36 as shown in Fig. 2, whereupon the pane is raised by pressure, and when fully raised it is caught and positively supported by the catch 50.

There is accomplished by this invention a pneumatic device for lowering or raising the windows in automotive vehicles or others in which a window may be raised under air pressure and held in the raised position mechanically, as well as lowered against spring tension on a pneumatic cushion.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A pneumatic device for opening and closing vehicle windows comprising a lever for raising the window, an air cylinder provided with a piston and rod for raising the lever, the said piston rod provided on its free end with a rotatable roller adapted to bear against the lever and with similar rollers adapted to travel on supports in order to guide and support the piston rod, and means to control the introduction and withdrawal of air to and from the cylinder.

2. A pneumatic device for opening and closing vehicle windows comprising a lever pivoted at one end and having its other end in sliding engagement with the base of the window, an air cylinder provided with a piston and piston rod, said cylinder being positioned between two upright supports, a rotatable and channeled roller at the free end of the piston rod adapted to bear against the lever, other rollers mounted on the piston rod and adapted to bear against the supports, and means to control the admission and withdrawal of air to and from the cylinder.

3. A pneumatic device for opening and closing vehicle windows comprising a lever for raising the window, said lever being pivoted at one end to a stationary support and at the other end maintained in constant engagement with the window, an air cylinder provided with a piston and rod for raising the lever, the said piston rod provided on its free end with a rotatable roller adapted to bear against the lever and with similar rollers adapted to travel on supports in order to guide and support the piston rod, and means to control the introduction and withdrawal of air to and from the cylinder.

4. A pneumatic device for opening and closing vehicle windows comprising a lever for raising the window, an air cylinder provided with a piston and rod for raising the lever, the said piston rod provided on its free end with a rotatable roller adapted to bear against the lever and with similar rollers adapted to travel on supports in order to guide and support the piston rod, means to control the introduction and withdrawal of air to and from the cylinder, a latch adapted to resiliently bear against the pane of the window during raising thereof, means for urging the latch beneath the window pane when the latter is in raised position, and means for releasing the latch when the piston is lowered within the cylinder.

GEORGE I. WADDEY.